(12) United States Patent
Broden

(10) Patent No.: US 8,042,401 B2
(45) Date of Patent: Oct. 25, 2011

(54) ISOLATION SYSTEM FOR PROCESS PRESSURE MEASUREMENT

(75) Inventor: David A. Broden, Andover, MN (US)

(73) Assignee: Rosemount, Inc., Eden Prairie, MN (US)

( * ) Notice: Subject to any disclaimer, the term of this patent is extended or adjusted under 35 U.S.C. 154(b) by 700 days.

(21) Appl. No.: 12/137,648

(22) Filed: Jun. 12, 2008

(65) Prior Publication Data

US 2009/0308170 A1 Dec. 17, 2009

(51) Int. Cl.
*G01L 9/00* (2006.01)
(52) U.S. Cl. .......... 73/723; 73/715; 361/283.4
(58) Field of Classification Search .......... None
See application file for complete search history.

(56) References Cited

U.S. PATENT DOCUMENTS

| | | | |
|---|---|---|---|
| 3,388,597 A | 6/1968 | Bargen et al. | 73/398 |
| 4,169,389 A * | 10/1979 | Yasuhara et al. | 73/718 |
| 4,262,540 A * | 4/1981 | Tamai et al. | 73/718 |
| 4,833,922 A | 5/1989 | Frick et al. | 73/756 |
| 5,157,972 A | 10/1992 | Broden et al. | 73/718 |
| 5,287,746 A | 2/1994 | Broden | 73/706 |
| 5,438,876 A * | 8/1995 | Lewis | 73/726 |
| 5,522,267 A * | 6/1996 | Lewis | 73/726 |
| 5,731,522 A * | 3/1998 | Sittler | 73/708 |
| 6,038,961 A * | 3/2000 | Filippi et al. | 92/98 R |
| 6,561,038 B2 | 5/2003 | Gravel et al. | 73/729.2 |
| 6,675,655 B2 | 1/2004 | Broden et al. | 73/716 |
| 6,725,731 B2 | 4/2004 | Wiklund et al. | 73/861.52 |
| 6,782,754 B1 | 8/2004 | Broden et al. | 73/753 |
| 6,843,133 B2 | 1/2005 | Broden et al. | 73/718 |
| 6,843,139 B2 | 1/2005 | Schumacher et al. | 73/861.52 |
| 6,883,380 B2 * | 4/2005 | Romo | 73/729.2 |
| 7,036,381 B2 | 5/2006 | Broden et al. | 73/708 |
| 7,080,558 B2 | 7/2006 | Broden et al. | 73/706 |
| 7,117,745 B2 | 10/2006 | Broden | 73/706 |
| 7,258,021 B2 | 8/2007 | Broden | 73/756 |
| 7,373,831 B2 | 5/2008 | Broden | 73/715 |
| 7,377,176 B1 | 5/2008 | Broden | 73/753 |

(Continued)

FOREIGN PATENT DOCUMENTS

EP 1 333 264 8/2003

(Continued)

OTHER PUBLICATIONS

International Search Report and Written Opinion for international application No. PCT/US2009/046060, dated Sep. 3, 2009.

(Continued)

*Primary Examiner* — Lisa Caputo
*Assistant Examiner* — Jermaine Jenkins
(74) *Attorney, Agent, or Firm* — Christopher R. Christenson; Westman, Champlin & Kelly, P.A.

(57) ABSTRACT

A process fluid pressure transmitter includes a pressure sensor, transmitter electronics, and an isolation system. The pressure sensor has an electrical characteristic that changes with pressure. The transmitter electronics are coupled to the pressure sensor to sense the electrical characteristic and calculate a pressure output. The isolation system includes a base member, and isolation diaphragm, and a fill-fluid. The isolation diaphragm is mounted to the base member and interposed between the pressure sensor and a process fluid. The fill-fluid is disposed between the isolation diaphragm and the pressure sensor. The base member and the isolation diaphragm are constructed from different materials such that the coefficient of thermal expansion of the isolation diaphragm is larger than the coefficient of thermal expansion of the base member.

14 Claims, 5 Drawing Sheets

U.S. PATENT DOCUMENTS

| | | | |
|---|---|---|---|
| 7,401,522 B2 | 7/2008 | Broden et al. | 73/716 |
| 7,437,939 B1 | 10/2008 | Chakraborty et al. | 73/715 |
| 7,454,975 B2 | 11/2008 | Louwagie et al. | 73/715 |
| 7,591,184 B2 | 9/2009 | Broden | 73/718 |
| 7,694,572 B2 * | 4/2010 | Kopp | 73/708 |
| 2008/0223140 A1 | 9/2008 | Broden | 73/718 |
| 2008/0245152 A1 | 10/2008 | Louwagie et al. | 73/706 |
| 2008/0253058 A1 | 10/2008 | Chakraborty et al. | 361/283.4 |

FOREIGN PATENT DOCUMENTS

| | | |
|---|---|---|
| GB | 2 071 853 | 9/1981 |
| JP | 2005265784 | 9/2005 |

OTHER PUBLICATIONS

Official Communication pursuant to Rules 161 and 162 EPC from European patent application No. 09763295.4 dated Feb. 2, 2011.

* cited by examiner

ISOLATION SYSTEM FOR PROCESS PRESSURE MEASUREMENT

BACKGROUND

Industrial process pressure transmitters are used to measure the pressure of an industrial process fluid such as a slurry, liquid, vapor or gas in chemical, pulp, petroleum, gas, pharmaceutical, food and/or other fluid processing plants. Industrial process fluid pressure transmitters are often placed near the process fluids, or in field applications. Often these field applications are subject to harsh and varying environmental conditions that provide challenges for designers of such transmitters.

The sensing element in many process fluid pressure transmitters is often a capacitance-based sensor that includes a deflectable sensing diaphragm and two or more capacitance electrodes. A dielectric fill-fluid is often used between the capacitance plates and the diaphragm. An isolation diaphragm generally interfaces with the process fluid and prevents the process fluid, which at times can be harsh, corrosive, dirty, contaminated, or at an extremely elevated temperature, from interacting with the components of the sensor. Generally, the process fluid acts against the isolation diaphragm generating a deflection of the isolation diaphragm that moves, or otherwise displaces, the fill-fluid behind the diaphragm, which fill-fluid then accordingly moves or otherwise displaces the sensing diaphragm of the pressure sensor. The pressure sensor has an electrical characteristic, such as capacitance, that varies with the applied pressure and that electrical characteristic is measured, or otherwise determined, by measurement circuitry within the process fluid pressure transmitter and an output signal related to the process fluid pressure is generated. This output signal can further be formatted in accordance with known industry standard communication protocols and transmitted through a process communication loop to other field devices, or a controller.

As the state of the art for process fluid pressure transmitters has advanced, sensing techniques and accuracy have improved. However, manufacturers of such devices are still called upon to provide devices with more exacting precision and accuracy. Accordingly, providing a process fluid pressure transmitter with improved accuracy and precision would benefit the art of industrial process measurement and control.

SUMMARY

A process fluid pressure transmitter includes a pressure sensor, transmitter electronics, and an isolation system. The pressure sensor has an electrical characteristic that changes with pressure. The transmitter electronics are coupled to the pressure sensor to sense the electrical characteristic and calculate a pressure output. The isolation system includes a base member, and isolation diaphragm, and a fill-fluid. The isolation diaphragm is mounted to the base member and interposed between the pressure sensor and a process fluid. The fill-fluid is disposed between the isolation diaphragm and the pressure sensor. The base member and the isolation diaphragm are constructed from different materials such that the coefficient of thermal expansion of the isolation diaphragm is larger than the coefficient of thermal expansion of the base member.

DETAILED DESCRIPTION

Some aspects and embodiments of the present invention generally stem from a unique appreciation of a problem that has plagued the art of isolator system design. Specifically, industrial process fluid pressure transmitters that measure hot industrial fluids, such as steam, often exhibit higher errors under both "steady state" and transient conditions. These measurement errors are common in process fluid pressure measurement transmitters that measure gauge pressure, or absolute pressure, using a single diaphragm isolator. Additionally, these measurement errors are also present in remote seal systems as well as differential pressure measurement systems.

When measuring a very hot process fluid with a single isolator gauge or absolute pressure transmitter, the electronics and temperature compensating sensor are often located away from the flexible metal process fluid isolation diaphragm. This is particularly true when measuring at process fluid temperatures that are substantially above what typical industrial electronics can survive (i.e. 185° F.). In these installations, the hot process heats the isolation fluid (such as silicone oil or DC200) and the isolator diaphragm very quickly. The fill-fluid expands, extending the isolator diaphragm and the isolator diaphragm generates a back pressure (acting as a volumetric spring). The pressure sensor measures this condition as an error. This temperature-induced error is not fully compensated by the "ambient" temperature correction measurement system in a thermal transient system.

Depending on the configuration of the process fluid pressure transmitter, the error described above can remain even when the system has reached thermal steady state. This often happens when a single isolator remote seal is attached in the case of an absolute or gauge pressure measurement transmitter. The addition of a remote seal, for the purpose of thermal isolation (with or without a capillary) from a hot process, may have substantial measurement error.

The errors described above are mostly zero-based measurement errors. However, span (slope) can also be impacted. Because the error is mostly zero-based, lower pressure measurements are most vulnerable. These errors are also increased by oil or fill-fluid volume and diaphragm stiffness. Isolation diaphragm stiffness increases with smaller diameters, and thus smaller isolation diaphragms tend to generate greater errors. In order to address this error, large isolation diaphragms are often used in the case of high-temperature remote seals.

Figure 1A:
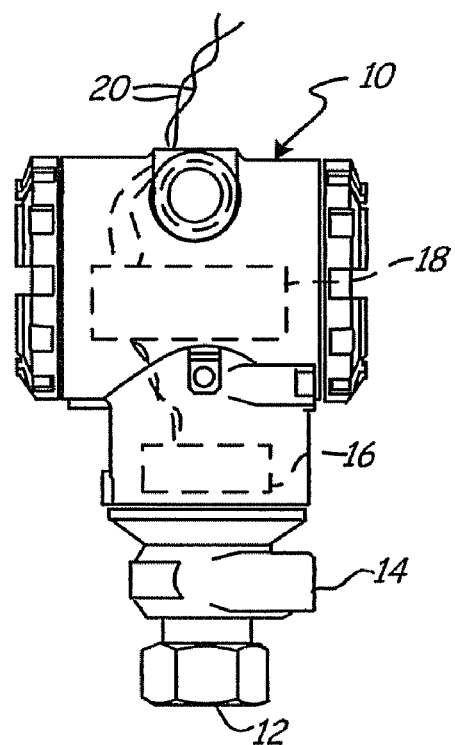
FIG. 1A is a diagrammatic view of a process fluid pressure transmitter with which embodiments of the present invention are particularly applicable.

FIG. 1A is a diagrammatic view of a process fluid pressure transmitter with which embodiments of the present invention are particularly applicable. Transmitter 10 includes a process fluid port 12 that is configured to receive a threaded inlet to convey process fluid thereto. Transmitter 10 also includes isolation system 14, which is illustrated in greater detail in FIG. 1B. Isolation system 14 is configured for direct contact with the process fluid present at port 12, and imparts a pressure to a fill-fluid, such as silicone oil, or DC200 available from Dow Corning Corporation of Midland, Mich., which conveys the pressure to pressure sensor 16 illustrated in phantom in FIG. 1A. Pressure sensor 16 generates an electrical signal or characteristic that is sensed by transmitter electronics 18. Transmitter electronics 18 is also further configured to compute the process fluid pressure based upon the sensor signal and transmit the computed process fluid pressure over a process communication loop, illustrated diagrammatically as wires 20.

Process fluid pressure transmitter 10 is an example of a single-inlet process fluid pressure transmitter such as a gauge or absolute pressure transmitter. Other exemplary process fluid pressure transmitters, with which embodiments of the present invention are particularly useful, include differential pressure transmitters. Essentially, anytime an isolation system is used to physically separate a process fluid from a pressure sensor using a fill-fluid, embodiments of the present invention can be practiced. Thus, even in a remote-seal application, embodiments of the present invention can be practiced.

Figure 1B:
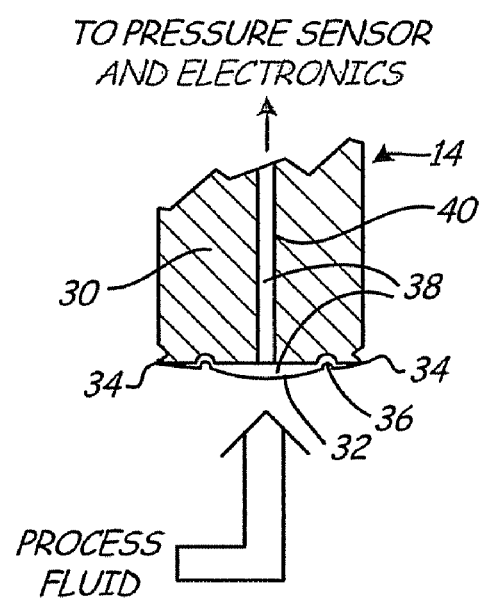
FIG. 1B is a diagrammatic view of a portion of an isolation system.

FIG. 1B is a diagrammatic view of isolation system 14. Isolation system 14 includes support base 30, which is preferably cylindrical and has a diameter of approximately ¾ inch. A common material for the construction of support base 30 is Type 316 stainless steel. Isolator diaphragm 32 is preferably circular and is welded about its periphery 34 to support base 30. Isolator diaphragm 32 generally includes at least one convolution 36, and is generally about one one-thousandth of an inch (0.001") thick. Further, isolator diaphragm 32 is generally formed of the same material as support base 30. Accordingly, isolator diaphragm 32 is also generally constructed of Type 316 stainless steel. As illustrated in FIG. 1B, process fluid bears against an outer surface of isolator diaphragm 32, which pressure is imparted to fill fluid 38 behind isolation diaphragm 32, and within passageway 40. Passageway 40 extends all the way up to pressure sensor 16 where the pressure of fill-fluid 38 is measured by sensor 16.

Figure 2:
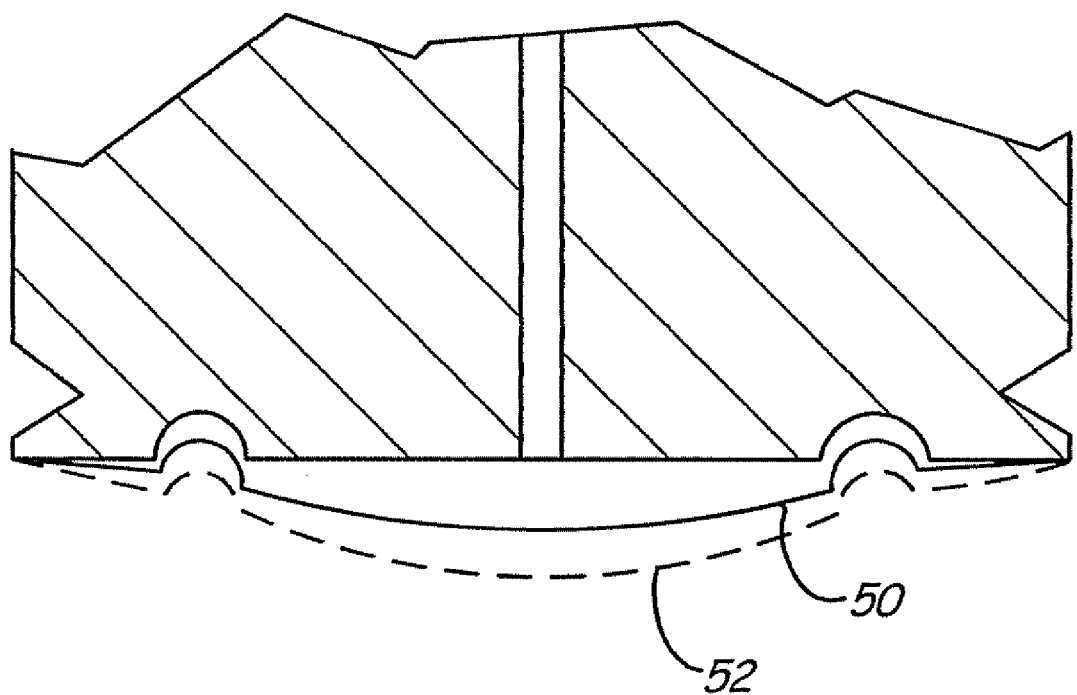
FIG. 2 illustrates the response of the isolator system to elevated temperature.
Figure 3A:
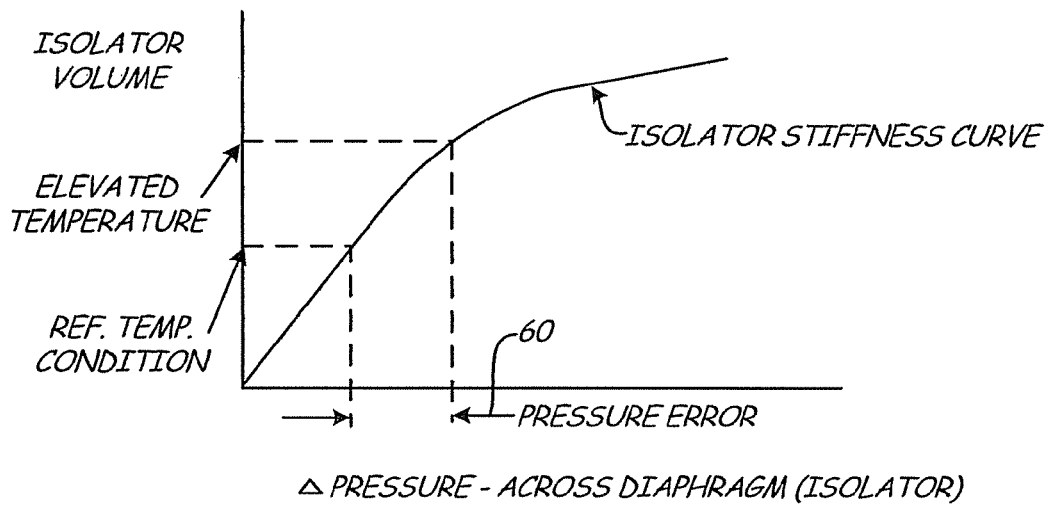
FIG. 3A is a chart of isolator volume vs. isolation diaphragm pressure in accordance with the prior art.

FIG. 2 illustrates the response of the isolator system to elevated temperature. Specifically, as the temperature increases, the diameter of both the support base and the isolator diaphragm increases in accordance with their coefficients of thermal expansion. Additionally, the fill-fluid proximate the isolator diaphragm is also exposed to the elevated temperature via conductance through the thin, metallic diaphragm, and it expands. Accordingly, as temperature increases, the diaphragm moves from the solid line illustration 50 to the phantom line illustration 52. As can be appreciated, as the diaphragm is exposed to hot process fluid, the fill-fluid expands extending the diaphragm. This causes an increase in back pressure in moving from the first temperature to the elevated second temperature as shown in the isolator stiffness chart (FIG. 3A). If the temperature continues to increase, radial tension builds in the diaphragm, increasing back pressure. Ultimately, the diaphragm can be permanently deformed when yield is exceeded. The isolation diaphragm stiffness at elevated temperature is virtually the same because the isolator is mounted on a base material of approximately the same thermal expansion as the isolator.

Embodiments of the present invention generally create a system where the thermal expansion of some of the fill-fluid is counter-balanced by a decrease in tension of the isolator diaphragm. One way in which this system can be implemented is in selecting the materials for the isolation diaphragm and the support/base member such that the isolator diaphragm has a higher coefficient of thermal expansion than the support/base member to which it is peripherally attached. Thus, as temperature increases, the isolation diaphragm grows relative to the base member to which it is attached. This thermally-induced growth generates a decrease in tension in the isolation diaphragm that offsets thermal expansion of the fill-fluid.

FIG. 3A is a chart of isolator volume vs. isolation diaphragm pressure in accordance with the prior art. As the temperature changes from a reference condition to an elevated condition, the isolation fluid volume changes. Additionally, the stiffness of the isolation diaphragm remains fixed. Accordingly, a pressure error 60 is generated.

Figure 3B:
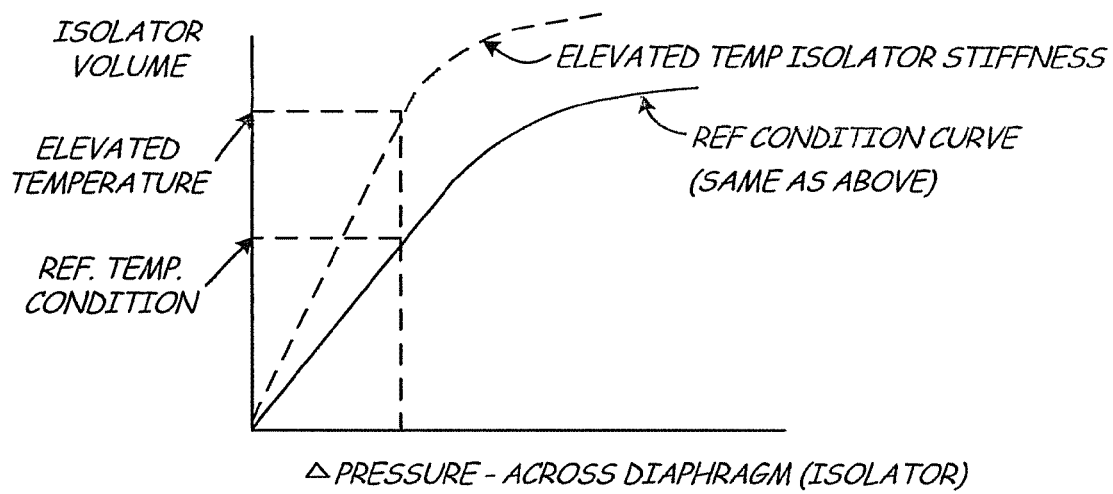
FIG. 3B is a chart of isolator volume vs. isolation diaphragm pressure in accordance with an embodiment of the present invention.

FIG. 3B is a chart of isolator volume vs. isolation diaphragm pressure in accordance with an embodiment of the present invention. In contrast to FIG. 3A, as can be seen, as the temperature changes from the reference temperature to the elevated temperature, the stiffness of the isolation diaphragm changes from the solid line to the phantom line. Additionally, as the isolation volume fluid changes, the pressure across the isolation diaphragm stays the same and thus there is no thermally-induced pressure error. Accordingly, if properly designed, isolation diaphragm expands with elevated temperature faster than its base. This effectively relieves tension built up by the expanding fill-fluid. It is believed that with proper design, the net effect will be that any temperature-induced isolation system errors can be substantially reduced or eliminated.

In accordance with one embodiment of the present invention, a specific material example is provided. As can be appreciated, the choice of the base material, isolation diaphragm material and isolation diaphragm size and construction can vary. In this case the isolation diaphragm is made of Type 316 stainless steel. This material expands at a rate of $17 \times 10^{-6}/°$ C. However, the base material is selected to be Type 400 series stainless steel. The base material expands $11 \times 10^{-6}/°$ C. The high-temperature errors could be reduced by a factor of ten from the current state. While this example shows a difference of only $6 \times 10^{-6}/°$ C., other application may require a more significant difference between the coefficients of thermal expansion.

Figure 4:
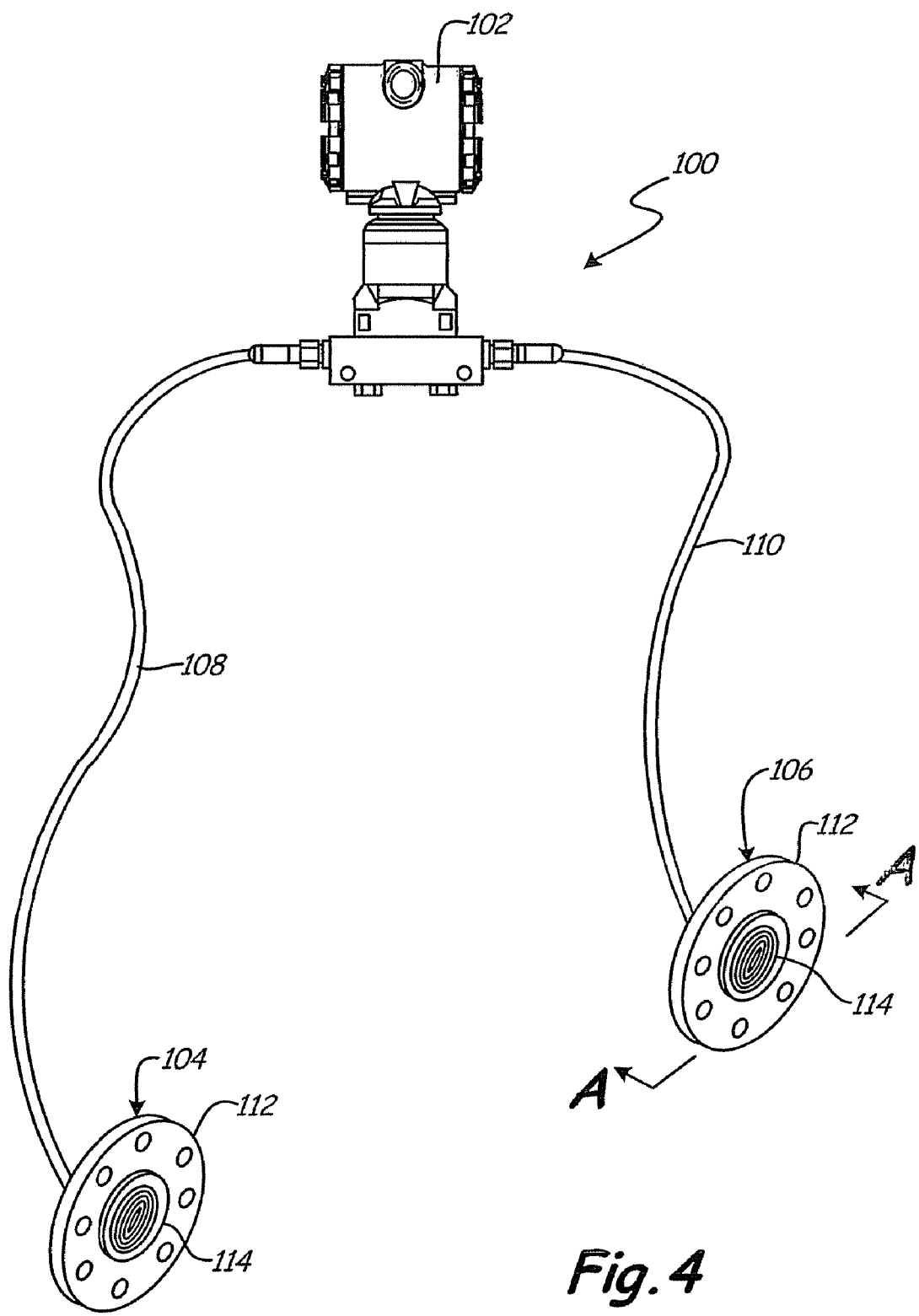
FIG. 4 is a diagrammatic view of a process fluid pressure measurement system with which embodiments of the present invention can be practiced.

FIG. 4 is a diagrammatic view of a process fluid pressure measurement system with which embodiments of the present invention can be practiced. System 100 includes a differential process fluid pressure transmitter 102 coupled to a pair of remote seals 104, 106 through respective capillary lines 108, 110. Each remote seal 104, 106 is configured to mount to a process fluid vessel such as a pipe or tank via its flange 112. Additionally, each remote seal includes an isolation diaphragm 114 that is configured to contact the process fluid. Differential process fluid pressure transmitter 102 is configured to measure a difference in pressure between pressures observed by each of remote seals 104, 106 and provide a process variable output, such a fluid level in a tank, over a process communication loop. As can be appreciated, if remote seals 104, 106 are mounted at different vertical levels on a tank, the difference in pressure is related to a difference in hydrodynamic pressure and thus the level of the process fluid in the tank.

Figure 5:
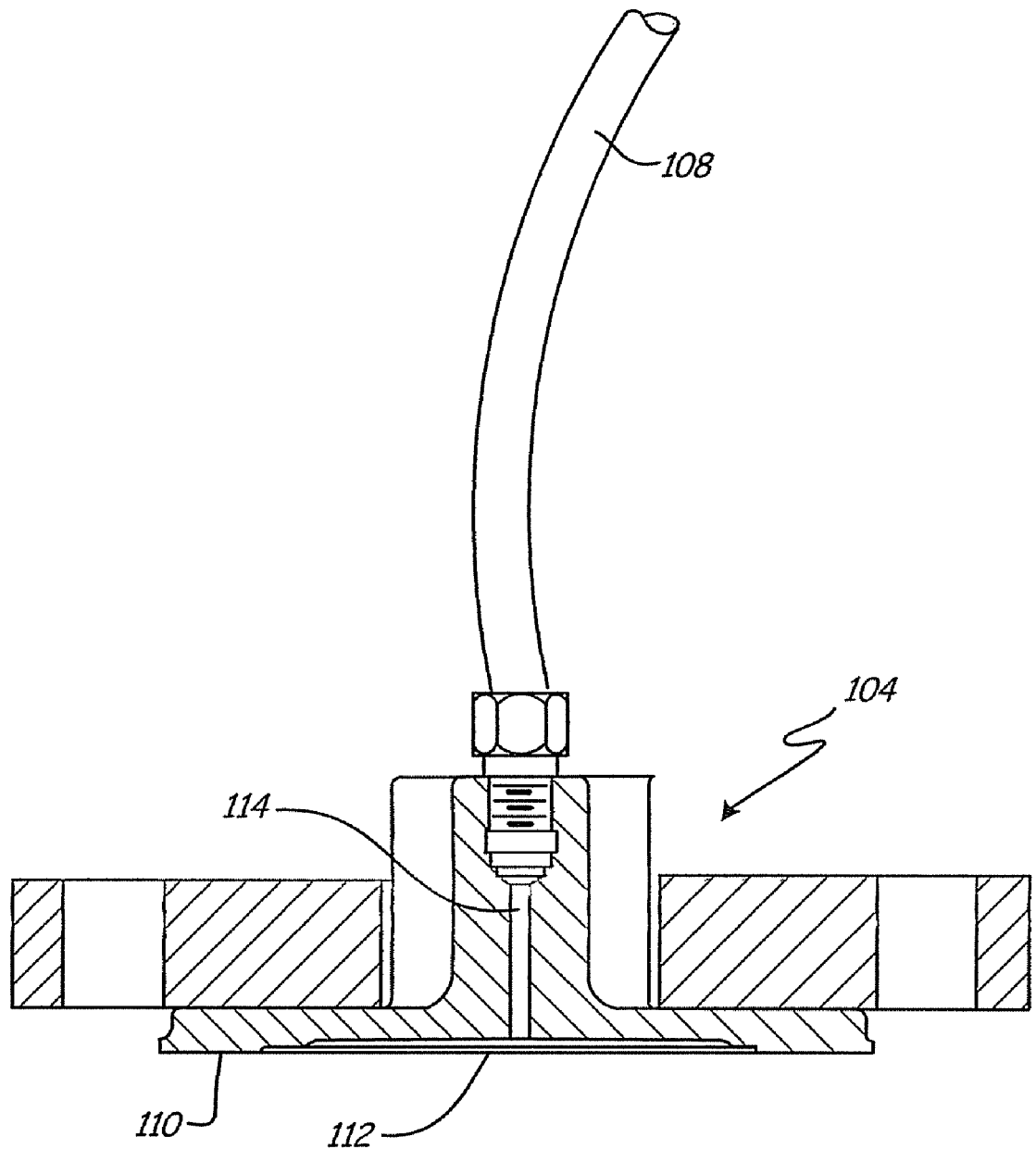
FIG. 5 is a cross-sectional diagram taken along section lines A-A in FIG. 4, illustrating the isolation diaphragm and base.

FIG. 5 is a cross-sectional diagram taken along section lines A-A in FIG. 4, illustrating the isolation diaphragm and base. Remote seal 104 includes base member 110 that surrounds isolation diaphragm 112. Both base member 110 and isolation diaphragm 112 are preferably circular. Further, the periphery of diaphragm 112 is preferably welded to base member 110. A fill-fluid 114 is disposed behind isolation diaphragm 112 and conveys pressure through capillary tube 108 to the differential pressure sensor of transmitter 102. In accordance with an embodiment of the present invention, isolation diaphragm and base member 110 are constructed from different materials, such that diaphragm 112 expands with temperature to a greater degree than base member 110.

Embodiments of the present invention provide for greater accuracy by reducing or eliminating thermally-induced errors in the isolation assembly. However, embodiments of the present invention also allow higher temperature processes to be measured (assuming that the fill fluids are compatible with the high temperature). Thus, processes fluid pressures that could not be reliably monitored, due to the temperature of the process fluid may now be better monitored and controlled.

Embodiments of the present invention are useful anytime oil heated proximate a diaphragm (sensing or isolation) can affect a system in an undesired way. Embodiments of the present invention allow expansion to accommodate, at least partially, the expanding fluids from other parts of the system, such as capillaries, when an ambient temperature increase is experienced that heats the entire system, or even a portion thereof. The rest of the system often holds more fill fluid than the cold-height of the isolator.

As another example, a 0.75" diameter isolation diaphragm formed of 316 Series Stainless Steel can be used in conjunction with a base formed of 400 Series Stainless Steel. DC 200 fill fluid can be filled to an initial level of 0.008 inches. This creates an initial isolator volume of about 0.00062 cubic inches. A temperature increase of 100 degrees Celsius causes the volume to increase of about 0.0000672 cubic inches. In reality, there is oil within the tubes and sensor system that also needs to expand into the isolator, as that is the only place it can go. Given all of the above parameters, calculations indicate that the isolator volume increase due to the differential expansion between the isolator and the base is about 0.00175 cubic inches. Accordingly, embodiments of the present invention can accommodate a relatively substantial expansion of the oil within the sensor and/or capillary.

Although the present invention has been described with reference to preferred embodiments, workers skilled in the art will recognize that changes may be made in form and detail without departing from the spirit and scope of the invention. For example, while much of the disclosure is directed to a single isolation diaphragm absolute or gauge process fluid pressure transmitter, embodiments of the present invention are applicable to remote seals as well as differential pressure process fluid pressure transmitters.

What is claimed is:

1. A process fluid pressure transmitter comprising:
    a pressure sensor having an electrical characteristic that changes with pressure;
    transmitter electronics coupled to the pressure sensor to sense the electrical characteristic and calculate a pressure output; and
    an isolation system including:
        a base member,
        an isolation diaphragm mounted to the base member and interposed between the pressure sensor and a process fluid,
        a fill-fluid disposed between the isolation diaphragm and the pressure sensor, and
        wherein the base member and the isolation diaphragm are constructed from different materials, and wherein the coefficient of thermal expansion of the isolation diaphragm is larger than the coefficient of thermal expansion of the base member.

2. The transmitter of claim 1, wherein the difference in coefficients of thermal expansion is about $6\times10^{-6}/°$ C.

3. The transmitter of claim 1, wherein the isolation diaphragm is constructed from Type 316 stainless steel.

4. The transmitter of claim 3, wherein the base member is constructed from Type 400 stainless steel.

5. The transmitter of claim 1, wherein the fill fluid is DC200.

6. The transmitter of claim 1, wherein each of the isolation diaphragm and the base member are circular.

7. The transmitter of claim 1, wherein the transmitter is an absolute process fluid pressure transmitter.

8. The transmitter of claim 1, wherein the transmitter is a gauge process fluid pressure transmitter.

9. An isolation system for conveying a process fluid pressure to a pressure sensor of a process fluid pressure transmitter, the system comprising:
    a base member;
    an isolation diaphragm mounted to the base member and having a first side and a second side, the first side being disposed for contact with a process fluid;
    a fill-fluid disposed adjacent the second side of the isolation diaphragm; and
    wherein the base member and the isolation diaphragm are constructed from different materials, and wherein the coefficient of thermal expansion of the isolation diaphragm is larger than the coefficient of thermal expansion of the base member.

10. The system of claim 9, wherein the system is a remote seal system.

11. The system of claim 10, and further comprising a capillary tube containing at least some of the fill-fluid.

12. The system of claim 11, and further comprising a differential pressure transmitter coupled to the capillary tube.

13. The system of claim 12, and further comprising a second remote seal coupled to the differential pressure transmitter.

14. A method of measuring process fluid pressure at different thermal conditions, the method comprising:
    conveying a process fluid against an isolation diaphragm, to displace the isolation diaphragm;
    causing displacement of the isolation diaphragm to displace a sensing diaphragm of a pressure sensor through a fill-fluid, wherein the fill fluid expands with elevated temperature; and
    decreasing tension of the isolation diaphragm with elevated temperature to offset at least some of the expansion of the fill fluid.

* * * * *